United States Patent [19]

Ferri, Jr. et al.

[11] Patent Number: 5,874,049

[45] Date of Patent: Feb. 23, 1999

[54] TWO-STAGE CHEMICAL MIXING SYSTEM

[75] Inventors: Edward T. Ferri, Jr., Gilroy, Calif.; J. Tobin Geatz, Wilmington, N.C.; Randall L. Green, Watsonville, Calif.

[73] Assignee: Applied Chemical Solutions, Inc., Chaska, Minn.

[21] Appl. No.: 789,335

[22] Filed: Jan. 23, 1997

Related U.S. Application Data

[63] Continuation of Ser. No. 554,787, Nov. 7, 1995, Pat. No. 5,632,960.

[51] Int. Cl.$^6$ .................................................. B01F 15/04
[52] U.S. Cl. ...................... 422/106; 366/132; 366/152.1; 366/152.2; 366/153.1; 366/162.1; 422/110; 422/111; 422/256
[58] Field of Search ..................................... 422/106, 110, 422/111, 256; 366/132, 152.1, 152.2, 153.1, 162.1

[56] References Cited

U.S. PATENT DOCUMENTS

| | | | |
|---|---|---|---|
| 3,877,682 | 4/1975 | Moss | 259/7 |
| 3,960,295 | 6/1976 | Horak | 222/145 |
| 4,019,528 | 4/1977 | Tyrrell | 137/209 |
| 4,106,671 | 8/1978 | Sharples | 222/61 |
| 4,223,806 | 9/1980 | Buschmann | 222/23 |
| 4,242,841 | 1/1981 | Ushatov et al. | 51/263 |
| 4,362,033 | 12/1982 | Young | 68/207 |
| 4,380,248 | 4/1983 | Ambrus et al. | 137/428 |
| 4,475,821 | 10/1984 | Koch et al. | 366/160 |
| 4,523,854 | 6/1985 | Beckley | 366/132 |
| 4,580,699 | 4/1986 | Black et al. | 222/64 |
| 4,823,987 | 4/1989 | Switall | 222/63 |
| 4,863,277 | 9/1989 | Neal et al. | 366/137 |
| 5,108,655 | 4/1992 | Johns, Jr. et al. | 252/321 |
| 5,137,694 | 8/1992 | Copeland et al. | 422/106 |
| 5,148,945 | 9/1992 | Geatz | 222/1 |
| 5,330,072 | 7/1994 | Ferri, Jr. et al. | 222/1 |
| 5,340,210 | 8/1994 | Patel et al. | 366/132 |
| 5,348,389 | 9/1994 | Jönsson et al. | 366/136 |
| 5,370,269 | 12/1994 | Bernosky et al. | 222/61 |
| 5,417,346 | 5/1995 | Ferri, Jr. et al. | 222/61 |
| 5,490,611 | 2/1996 | Bernosky et al. | 222/1 |

FOREIGN PATENT DOCUMENTS

73.18826  12/1974  France.

*Primary Examiner*—Timothy McMahon
*Attorney, Agent, or Firm*—Faegre & Benson, LLP

[57] ABSTRACT

A chemical mixing system for mixing ingredients at desired concentrations concentration within a qualification range. Batches of the mixed chemical are mixed in a relatively small mix vessel and transferred to a relatively large mix drum. The concentration of the chemical within the mix drum is measured by a concentration monitor. If the measured concentration of the chemical in the mix drum is within the qualification range, the batches of chemical in the mix vessel are mixed to the desired concentration. If the measured concentration of the chemical in the mix drum is below the qualification range, the batches of chemical in the mix vessel are mixed to a high concentration which is greater than the desired concentration. If the measured concentration of the chemical in the mix drum is above the qualification range, the batches of chemical in the mix vessel are mixed to a low concentration which is less than the desired concentration. Batch averaging is thereby performed to maintain the concentration of chemical in the mix drum within the desired qualification range.

35 Claims, 3 Drawing Sheets

TWO-STAGE CHEMICAL MIXING SYSTEM

The present application is a continuation of application Ser. No. 08/554,787, filed Nov. 7, 1995.

FIELD OF THE INVENTION

The present invention is a chemical blending or mixing system. In particular, the invention is a system for mixing concentrated chemicals from two or more chemical components for subsequent use in semiconductor fabrication facilities.

BACKGROUND OF THE INVENTION

Chemical generation or mixing systems are used in a variety of industrial applications to blend two or more components or constituents to a desired concentration. In semiconductor fabrication facilities, for example, concentrated chemicals (which are usually provided by commercial chemical suppliers in solution with water) are commonly mixed or diluted with DI (deionized or ultra pure) water before being sprayed on or otherwise applied to semiconductor wafers. Table 1 below lists a number of chemicals used in semiconductor fabrication facilities, and the concentration (in weight %) in which these chemicals are typically provided by suppliers.

TABLE 1

| Chemical | Symbol | Percentage Concentrate in Water |
|---|---|---|
| Hydrofluoric Acid | HF | 49% |
| Acetic Acid | HAC | 99.7% |
| Nitric Acid | $HNO_3$ | 71% |
| Phosphoric Acid | $H_3PO_4$ | 80% |
| Potassium Hydroxide | KOH | 30% |
| Tetramethyl Ammonium Hydroxide | TMAH | 25% |
| Hydrochloric Acid | HCl | 37% |
| HF and Ammonium Fluoride Mixtures | BOEs | — |
| Ammonium Hydroxide | $NH_4OH$ | 28–30% |
| Sulfuric Acid | $H_2SO_4$ | 93–98% |

When used in semiconductor fabrication facilities, the concentrated chemicals described above are commonly diluted with DI water (i.e., a diluent) to desired concentrations or assays. Concentrations in these applications are typically described in terms of weight % (weight percent) of concentrated or pure chemical in water. Hydrofluoric Acid (HF), for example, is often diluted with ultra pure water to concentrations ranging from about 0.5%–5% HF by weight when used for etching and cleaning processes. Tetramethyl Ammonium Hydroxide (TMAH) is often diluted to about 2.38 weight % for use as a positive photoresist developer. Non-aqueous blended chemicals, and blended chemicals with three or more components, can also be generated.

Chemical mixing systems blend the chemicals to a desired concentration which is sometimes known as the nominal or qualification concentration. A high degree of accuracy is also required. The range or window of acceptable concentrations surrounding the qualification concentration is known as the qualification range, and can be defined as a weight % error with respect to the qualification concentration, or by upper and lower qualification range concentrations. Chemical blending systems of the type described above are commercially available from a number of sources including FSI International of Chaska, Minn. and Applied Chemical Solutions of Hollister, Calif.. They are also disclosed generally in the Geatz U.S. Pat. No. 5,148,945 and the Ferri, Jr. et al. U.S. Pat. No. 5,330,072.

There remains, however, a continuing need for improved chemical blending systems. In particular, there is a need for chemical blending systems capable of quickly blending batches of chemical to a very high degree of accuracy. To be commercially viable, the chemical blending systems must also be highly reliable.

SUMMARY OF THE INVENTION

The present invention is a chemical mixing system capable of quickly and accurately blending chemicals. One embodiment of the system is configured for controlling a concentration of a chemical species in an admixture such that the concentration of the chemical species is maintained within a defined qualification range. The system includes a mix vessel having an internal volume suitable for preparing a batch from ingredients comprising a diluent and a concentrated solution containing a relatively high concentration of the chemical species relative to the qualification range. The mix vessel is adapted to receive the concentrated solution and the diluent from first and second supply sources, respectively. The system further includes a mix drum having an internal volume for holding a supply of the admixture. The internal volume of the mix drum is of a size sufficient for holding a plurality of batches prepared in the mix vessel. The mix drum is coupled to the mix vessel so that one or more batches prepared in the mix vessel can be transported to the internal volume of the mix drum in order to replenish the supply of, and controllably adjust the concentration of the first chemical species in, the chemical admixture. The system further includes a control system responsive to information comprising a measured concentration of the chemical species in the admixture. The control system is capable of generating control signals for controlling the amounts of the concentrated solution and the diluent which are combined in the mix vessel when a batch is prepared, so that the prepared batch comprises a corrective concentration of the chemical species relative to the measured concentration of the chemical species in the admixture.

In another aspect, the present invention provides a process for controlling the amount of the chemical species in the admixture. According to the process, a supply of the admixture is provided, wherein the admixture comprises a concentration of the chemical species. The concentration of the chemical species in the admixture is measured. It is then determined whether the measured concentration is within a defined qualification range. A batch is prepared comprising a corrective concentration of the chemical species relative to the measured concentration of the chemical species in the admixture. The batch is prepared by steps, including:

(i) providing ingredients comprising a concentrated solution and a diluent, wherein the concentrated solution contains a relatively high concentration of the chemical species relative to the qualification range;

(ii) providing a mix vessel having an internal volume suitable for preparing the batch, wherein the mix vessel is adapted to receive the concentrated solution and the diluent from first and second supply sources, respectively, and wherein the system is provided with a plurality of sensors capable of generating sensor signals representative of the respective amounts of the concentrated solution and the diluent which are added to the internal volume of the mix vessel; and (iii) adding amounts of said ingredients to the mix vessel effective to provide the batch with the corrective concentration of the chemical species, wherein the amount of said ingredients added to the mix vessel is controlled in response to information comprising the sensor signals and to the measured concentration of the chemical species in the admixture.

The prepared batch is then combined with the admixture supply in order to controllably adjust the concentration of the chemical species in the admixture.

The present invention also relates to an alternative embodiment of a process for controlling an amount of the chemical species in the admixture. According to this embodiment, a supply of the admixture is provided, wherein the admixture comprises a concentration of the chemical species. The concentration of the chemical species in the admixture is measured. It is then determined if the measured concentration is within a defined qualification range. The concentration of the chemical species in the admixture is batchwise adjusted in response to the measured concentration of the chemical species and the admixture. The batchwise adjustment includes the steps of:

(i) providing a concentrated solution having a high concentration of the chemical species relative to the qualification range;

(ii) providing a diluent;

(iii) providing a control system responsive to information comprising the measured concentration of the chemical species in the admixture, wherein said control system is capable of generating control signals for controlling respective amounts of the concentrated solution and the diluent in order to provide a batch having a corrective concentration of the chemical species relative to the measured concentration of the chemical species in the admixture; and (iv) using information comprising the control signals to controllably dilute the concentrated solution with an amount of the diluent effective to provide said batch having a corrective concentration of the chemical species relative to the measured concentration of the chemical species in the chemical admixture; and (v) combining the batch with the supply of the admixture.

DETAILED DESCRIPTION OF THE PREFERRED EMBODIMENTS

Figure 1:
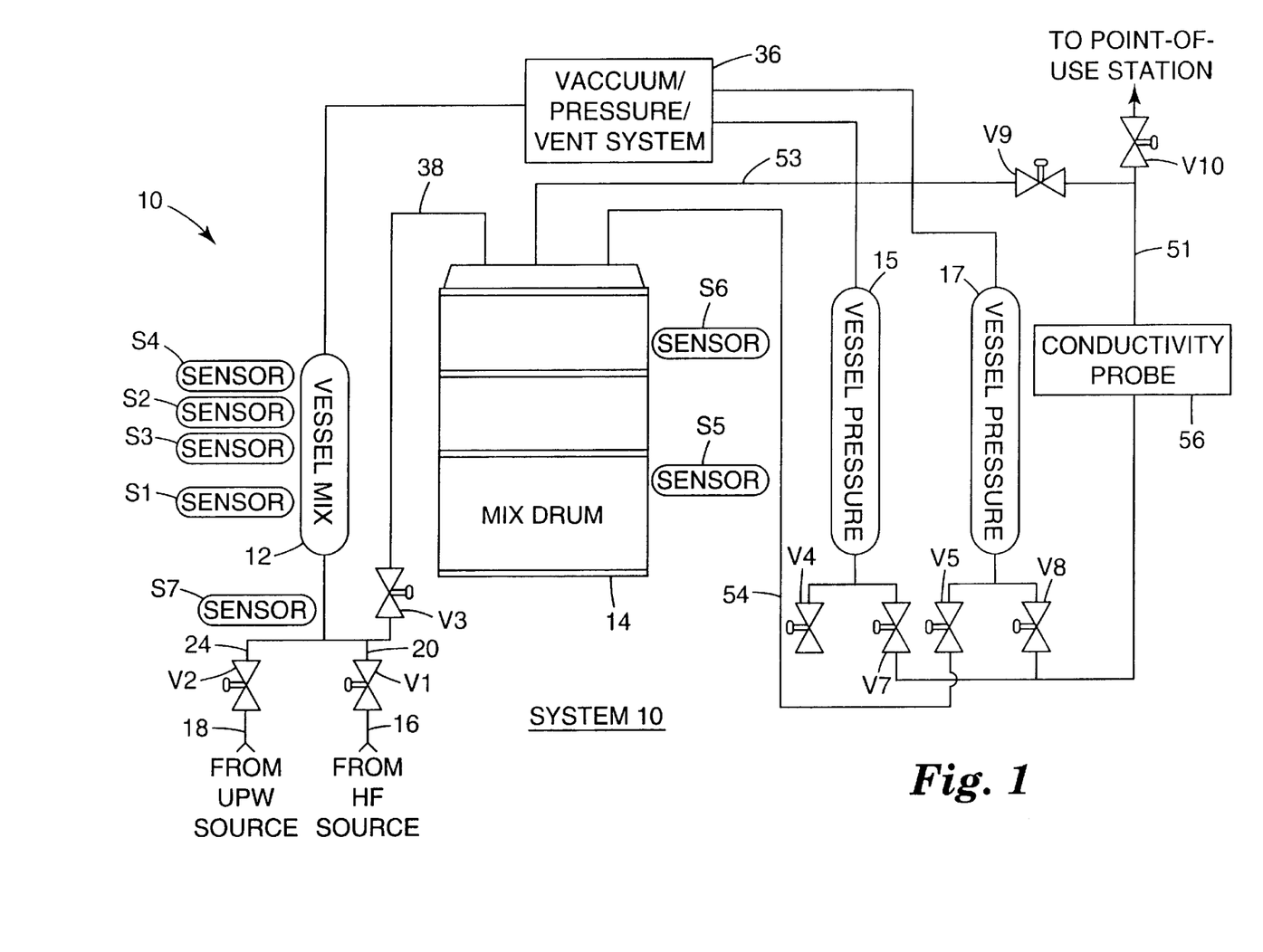
FIG. 1 is a diagrammatic illustration of a chemical mixing system in accordance with the present invention.

A chemical mixing system 10 in accordance with the present invention is illustrated generally in FIG. 1. As shown, system 10 includes mix vessel 12, mix drum 14, pressure/vacuum vessels 15 and 17, concentrated chemical inlet 16 and diluent inlet 18. Relatively small batches of chemical are mixed in mix vessel 12 and subsequently transferred to mix drum 14. The chemical in mix drum 14 is then blended together and stored until it is delivered to a point-of-use in a semiconductor fabrication facility. In one embodiment, mix vessel 12 has a nominal fluid capacity of about 1.5 gallons (5 liters), while mix drum 14 has a nominal capacity of about 15 gallons (50 liters). As is described in greater detail below, the volume ratios of the chemical constituents mixed within mix vessel 12 are controlled as a function of the monitored concentration of the mixed chemical within drum 14. In this manner mixing system 10 effectively utilizes a two-stage, batch averaging process to mix the chemical constituents to the desired concentration with a high degree of accuracy.

Vessels 12, 15 and 17 and drum 14 are fabricated from a material such as Teflon PFA (perfluoroalkoxy) or ultra high molecular weight polyethylene which is resistant to corrosion by the blended chemical. The illustrated embodiment of mixing system 10 is configured for diluting and mixing concentrated hydrofluoric acid (HF) with ultra-pure water (UPW). Concentrated chemical inlet 16 is therefore adapted to be fluidly coupled to a drum or other source of concentrated HF, while diluent inlet 18 is adapted to be fluidly coupled to a pressurized source of ultra-pure water. Concentrated chemical inlet 16 is fluidly coupled to mix vessel 12 by line 20. An on-off control valve V1 is positioned in line 20 to control the flow of HF through the line. Diluent inlet 18 is fluidly coupled to mix vessel 12 by line 24. On-off control valve V2 is positioned in line 24 to control the flow of ultra-pure water through the line. The fluid level within mix vessel 12 is monitored by first, second, third, fourth and seventh mix vessel level sensors S1, S2, S3, S4 and S7, respectively. As is described in greater detail below, a vacuum/pressure/vent system 36 is fluidly coupled to the mix vessel 12 and pressure/vacuum vessels 15 and 17, and is used to motivate the chemical constituents and mixed chemicals through system 10.

Mix vessel 12 is fluidly coupled to mix drum 14 by mix drum line 38. The flow of chemical through line 38 is controlled by on-off control valve V3. The fluid level within mix drum 14 is monitored by first and second mix drum level sensors S5 and S6, respectively. A line 54 is used to transfer mixed chemical from mix drum 14 to pressure/vacuum vessels 15 and 17. On-off control valves V4 and V5 are positioned in line 54 to control the flow of chemical into pressure/vacuum vessels 15 and 17, respectively. From pressure/vacuum vessels 15 and 17, chemical can be transferred to a point-of-use station (not shown) through distribution line 51 and on-off control valve V10 when valve V9 is closed. On-off control valves V7 and V8 are positioned to control the flow of chemical from pressure/vacuum vessels 15 and 17, respectively, into line 51. Alternatively, chemical in line 51 can be recirculated back to mix drum 14 through recirculation line 53 and on-off control valve V9 when valve V10 is closed.

Vacuum/pressure/vent system 36 is a conventional system which includes control valves (not separately shown) which couple mix vessel 12 and pressure/vacuum vessels 15 and 17 to both vacuum and pressure sources (also not shown). Systems of this type are well known and described, for example, in the Geatz U.S. Pat. No. 5,148,945 and the Ferri, Jr. et al. U.S. Pat. No. 5,330,072. Briefly, when it is desired to transfer chemical into one of vessels 12, 15 or 17 from a source, the associated control valve between the source and vessel is closed, and vacuum/pressure/vent system 36 is operated to create a vacuum within the vessel. The associated control valve between the source and vessel is then opened to allow the vacuum to draw chemical into the vessel from the source. To transfer chemical from one of vessels 12, 15 or 17 to a downstream location, the associated control valve between the vessel and the downstream location is opened, and the vacuum/pressure/vent system 36 is operated to pressurize the vessel and force the chemical therefrom. When a chemical constituent is provided by a pressurized source, system 36 vents the vessel to which the chemical constituent is to be transferred. Conventional pumps (e.g., diaphragm pumps) can be used in the lines addition to or in place of vacuum/pressure/vent system 36 to motivate chemical in system 10.

The concentration of the mixed chemical within drum 14 is monitored through the use of conductivity probe 56. Probe 56 is located in line 51 in the embodiment shown. In other embodiments (not shown), probe 56 can be positioned in other locations such as in lines 53 or 54 or within mix drum 14, depending on the characteristics of the monitor.

Figure 2:
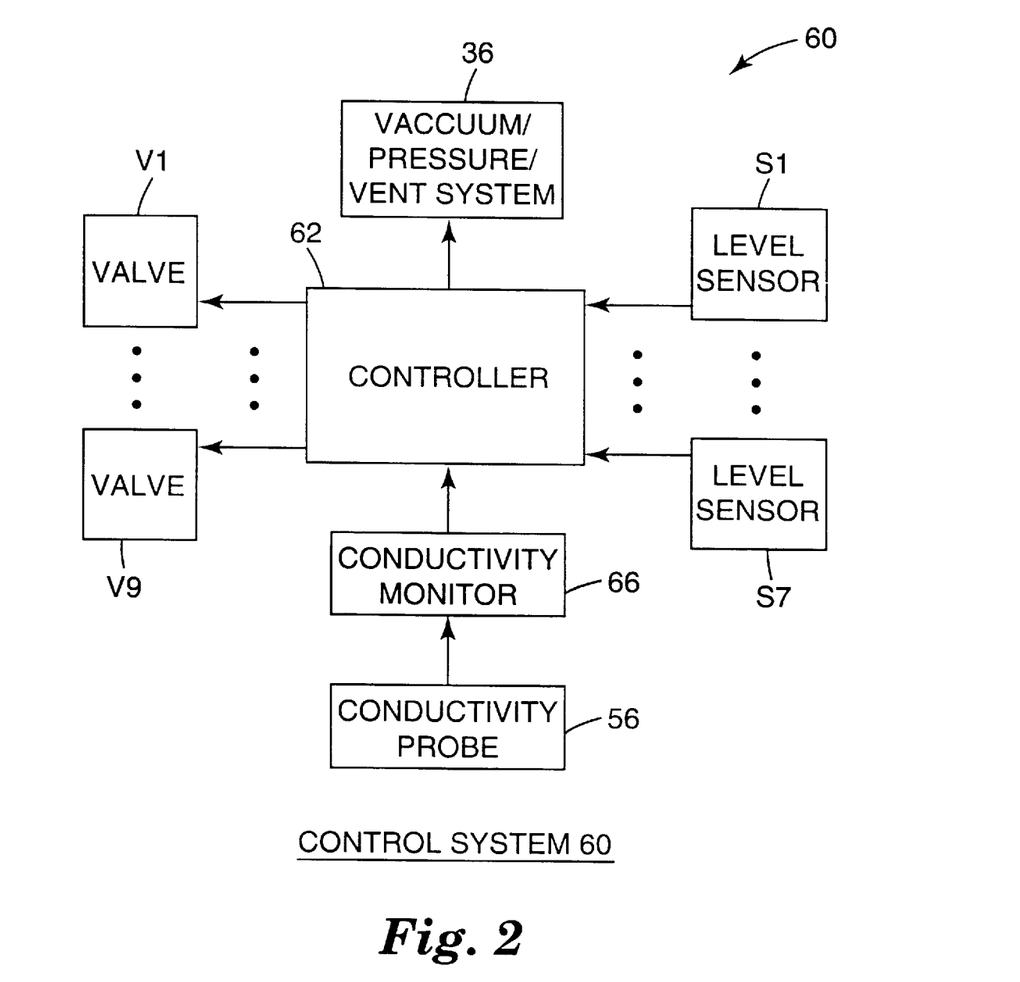
FIG. 2 is a block diagram of a control system for the chemical mixing system shown in FIG. 1.

FIG. 2 is a block diagram of a control system 60 used to control the operation of chemical mixing system 10. As shown, control system 60 includes a controller 62 which is interfaced to vacuum/pressure/vent system 36, control valves V1–V9 and level sensors S1–S7. Conductivity probe 56 is coupled to controller 62 through a conductivity monitor 66. The overall operation of system 10 is controlled by controller 62. Controller 62 is a digital programmable logic array in one embodiment, although hard-wired, microprocessor-based and other conventional control systems can also be used.

Monitor 66 drives conductivity probe 56 and processes signals received from the probe to generate digital concentration values representative of the weight percent concentration of the concentrated chemical flowing past the probe. Probes such as 56 and monitors such as 66 are well known and commercially available from a number of manufacturers such as Horiba Instruments Inc. A programmable conductivity monitor 66 is used in one embodiment of chemical mixing system 10. The programmable monitor 66 can be programmed with an Upper Qualification Range Setpoint and a Lower Qualification Range Setpoint. The Upper and Lower Qualification Range Setpoints are representative of mixed chemical concentrations above and below an ideal or desired mixed chemical concentration, respectively, and represent an acceptable window or range of final mixed chemical concentrations. The programmable monitor 66 provides signals to controller 62 indicating whether the measured chemical concentration is greater than the Upper Qualification Range Setpoint, less than the Lower Qualification Range Setpoint, or within the desired concentration range between the Upper and Lower Qualification Range Setpoints.

Level sensors S1–S7 are capacitive-type sensors in one embodiment of mixing system 10. These sensors S1–S7 are positioned at locations on the exterior of mix vessel 12 and mix drum 14 which correspond to predetermined levels or volumes of chemical within the vessel and drum. When the level of chemical within the mix vessel 12 and drum 14 increases or decreases to the level at which the sensors S1–S7 are located, the sensors provide signals representative of the level change condition to controller 62. Other types of level sensors, such as those which provide a continuous indication of the chemical level, can also be used.

In one embodiment of system 10, control valves V1–V9 are air-operated on-off valves. The supply of air used to actuate the control valves V1–V9 is coupled to the valves through solenoid valves (not separately shown) which are interfaced directly to controller 62. Control valves V1–V9 are therefore effectively responsive to and actuated by controller 62.

Relatively small batches of mixed chemical are mixed in mix vessel 12. Each such mix vessel batch will have a nominal batch volume. First mix vessel level sensor S1 is positioned at a first volume level on vessel 12. The first volume level corresponds approximately to a first chemical constituent volume that will yield a mix vessel batch having the desired concentration (i.e., the desired volume proportion of first chemical constituent to the nominal mix batch volume). Second mix vessel level sensor S2 is positioned at a second volume level on mix vessel 12. The second volume level is a volume level which is greater than the first volume level by an amount which corresponds approximately to a second chemical constituent volume that will yield a mix vessel batch having the desired concentration (i.e., greater than the first volume level by an amount equal to the desired volume proportion of the second chemical constituent to the nominal mix batch volume).

Third mix vessel level sensor S3 is positioned at a third volume level on vessel 12. The third volume level is less than the second volume level, but greater than the first volume level by an amount which corresponds approximately to a second chemical constituent volume that will yield a mix vessel batch having a concentration which is slightly less than the desired concentration. Fourth mix vessel level sensor S4 is positioned at a fourth volume level on vessel 12. The fourth volume level is greater than the second volume level, and is greater than the first volume level by an amount which corresponds approximately to a second chemical constituent volume that will yield a mix vessel batch having a concentration which is slightly greater than the desired concentration. The amount by which the concentration of the mix vessel batches is less and greater than the desired concentration, and therefore the third and fourth volume levels, will depend upon a number of factors including the "concentration" of the concentrated chemical as supplied by commercial vendors, the ratio of the nominal mix vessel batch volume to the desired average level of mixed chemical in the mix drum 14, and the rate at which it is desired to vary the concentration of the mixed chemical within the mix drum by the addition of each mix vessel batch.

By way of example, one embodiment of chemical mixing system 10 is configured to blend ultra-pure water (the first chemical constituent) with concentrated HF (49% HF, the second chemical constituent) to a concentration of 4.9 weight % HF. The nominal mix batch volume in this embodiment is 1.5 gallons. To yield a 1.5 gallon mix vessel batch of mixed chemical having this desired concentration, vessel 12 should be filled with 1.35 gallons of ultra-pure water, and 0.15 gallons of concentrated HF. The first mix vessel level sensor S1 is therefore positioned at a level at which the sensor will provide signals indicating when the mix vessel 12 is filled to a volume level of 1.35 gallons. The second mix vessel level sensor S2 is positioned at a level at which the sensor will provide signals indicating when the mix vessel 12 is filled to a volume level of 1.5 gallons. In this embodiment the third mix vessel level sensor S3 and the fourth mix vessel level sensor S4 are set at volume levels of about 1.46 gallons and 1.54 gallons, respectively. Mix vessel batches made by filling mix vessel 12 beyond the first volume level to these third and fourth volume levels will have a concentration of about 3.6 and 6.2 weight % HF, respectively. Assuming the mix drum is filled to a level of about 10 gallons, the addition of mix batches at these concentration levels will change the concentration of the mixed chemical within the mix drum by about 0.1 weight %.

First mix drum level sensor S5 is positioned at a first or relatively low volume level on mix drum 14. Second mix drum level sensor S6 is positioned at a second or relatively high volume level on the mix drum 14. In the embodiment described above where mix drum 14 has a nominal capacity of about 15 gallons, first mix drum sensor S5 is set to measure a relatively low volume level of about 2 gallons, and second mix drum sensor S6 is set to measure a relatively high volume level of about 13 gallons.

The operation of mixing system 10 is controlled by controller 62. In particular, controller 62 can be operated in a mixing mode during which mix batches of the chemical constituents are blended in mix vessel 12 and transferred to mix drum 14. Controller 62 can also operate in a chemical transfer mode and a recirculation mode. During transfer mode operation the vacuum/pressure/vent system 36 operates pressure/vacuum vessels 15 and 17 in such a manner as to transfer the chemical in the mix drum 14 to a point-of-use station through lines 54 and 51. During recirculation mode operation the vacuum/pressure/vent system 36 operates pressure/vacuum vessels 15 and 17 in such a manner as to recirculate the chemical through lines 54, 51 and 53 back to the mix drum 14. Recirculation mode operation is used to completely mix the mix batches of chemical constituents in mix drum 14. Although not shown, other well known methods including an agitator in the mix drum 14 can be used to mix the chemical in the mix drum.

Figure 3:
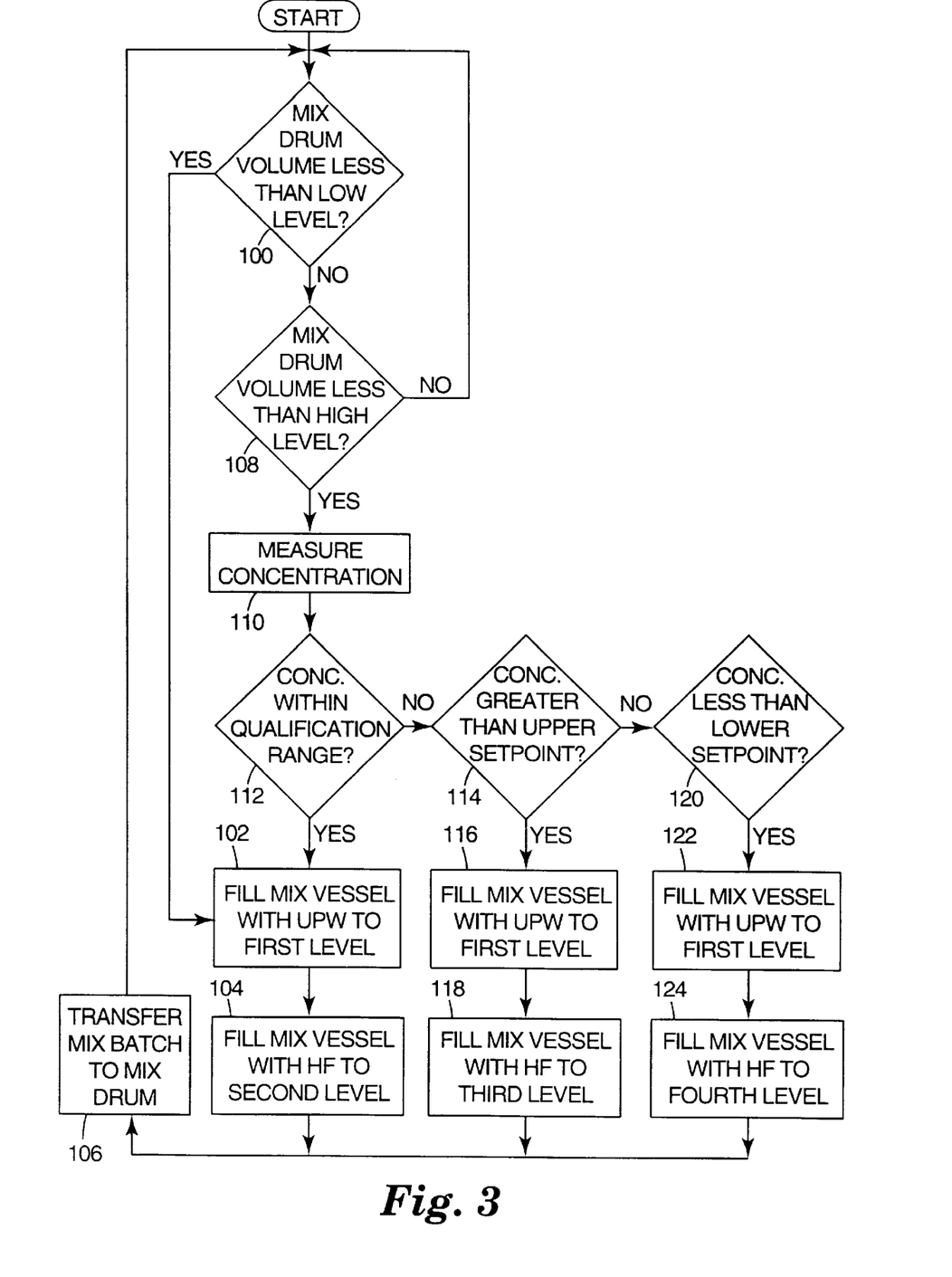
FIG. 3 is a flow diagram of the mixing mode operation of the chemical mixing and control systems.

Mixing mode operation of controller 62 can be described with reference to FIG. 3. Upon the initiation of mixing mode operation, and thereafter whenever mix drum level sensor S5 indicates that the level of mixed chemical within mix drum 14 is below the low volume level (step 100), controller 62 causes "regular" concentration batches of chemical to be mixed in mix vessel 12 in accordance with steps 102 and 104. To mix a regular concentration batch of chemical, controller 62 causes vacuum/pressure/vent system 36 to vent the mix vessel 12. Control valve V2 is then opened to allow ultra pure water to flow into mix vessel 12. When level sensor S1 indicates that the mix vessel 12 has been filled to the first volume level, controller 62 closes valve V2 to complete step 102. Controller 62 then causes vacuum/pressure/vent system 36 to draw a vacuum in mix vessel 12. After the vacuum is established, valve V1 is opened to allow concentrated HF to flow into mix vessel 12. When level sensor S2 indicates that the mix vessel 12 has been filled to the second volume level, controller 62 closes valve V1 to complete step 104.

After the batch is mixed, it is transferred to mix drum 14 as indicated by step 106. To perform the mix batch transfer, controller 62 causes vacuum/pressure/vent system 36 to pressurize mix vessel 12, and opens valve V3. The mixed batch of chemical is thereby motivated into the mix drum 14 through line 38. When sensor S7 indicates that the mix vessel 12 has been emptied, controller 62 closes valve V3 to end step 106. As is shown by FIG. 3, steps 100, 102, 104 and 106 are repeated to mix and transfer to mix drum 14 regular concentration batches of chemical until the mix drum is filled to the low level.

Recirculation mode operation of system 10 is initiated by controller 62 when mix drum 14 is filled to the low level determined by sensor 55. Whenever sensor S5 indicates that the level of chemical within mix drum 14 is greater than or equal to the low level (step 100) and sensor S6 indicates that the chemical level is less than the high level (step 108), controller 62 determines the then current concentration of the chemical within the mix drum as indicated by step 110. If at step 112 controller 62 determines that the measured concentration of the chemical within drum 14 is less than or equal to the Upper Qualification Range Setpoint and greater than or equal to the Lower Qualification Range Setpoint (i.e., within the desired qualification range), the controller causes a regular concentration batch of chemical to be mixed in mix vessel 12 and transferred to the mix drum in the manner described above (steps 102, 104 and 106).

If the measurement made at step 110 indicates that the then current concentration of the chemical within the mix drum 14 is greater that the Upper Qualification Range Setpoint (step 114), controller 62 causes a "low" concentration batch of chemical to be mixed in mix vessel 12 in accordance with steps 116 and 118. To mix a low concentration batch of chemical, controller 62 causes vacuum/pressure/vent system 36 to vent mix vessel 12. Valve V2 is then opened to allow ultra pure water to flow into mix vessel 12. When level sensor S1 indicates that the mix vessel 12 has been filled to the first volume level, controller 62 closes valve V2 to complete step 116. Vacuum/pressure/vent system 36 is then operated to draw a vacuum in the mix vessel 12. After the vacuum is established, valve V1 is opened to allow concentrated HF to flow into mix vessel 12. When level sensor S3 indicates that the mix vessel 12 has been filled to the third volume level, controller 62 closes valve V1 to complete step 118. The low concentration batch of chemical is then transferred to the mix drum 14 in accordance with step 106 described above. The addition of the low concentration mix batch of chemical to mix drum 14 will reduce the concentration of the chemical within the mix drum, and is done to lower the concentration to the desired concentration.

If the measurement made at step 110 indicates that the then current concentration of the chemical within the mix drum 14 is lower that the Lower Qualification Range Setpoint (step 120), controller 62 causes a "high" concentration batch of chemical to be mixed in mix vessel 12 in accordance with steps 122 and 124. To mix a high concentration batch of chemical, controller 62 causes vacuum/pressure/vent system 36 to vent mix vessel 12. Valve V2 is then opened to allow ultra pure water to flow into mix vessel 12. When level sensor S1 indicates that the mix vessel 12 has been filled to the first volume level, controller 62 closes valve V2 to complete step 122. Vacuum/pressure/vent system 36 is then operated to draw a vacuum in the mix vessel 12. After the vacuum is established, valve V1 is opened to allow concentrated HF to flow into mix vessel 12. When level sensor S4 indicates that the mix vessel 12 has been filled to the fourth volume level, controller 62 closes valve V1 to complete step 124. The high concentration batch of chemical is then transferred to the mix drum 14 in accordance with step 106 described above. The addition of the high concentration mix batch of chemical to mix drum 14 will increase the concentration of the chemical within the mix drum, and is done to raise the concentration to the desired concentration.

The generation of mix batches of chemical and the addition of the batches to the mix drum 14 in the manner described above continues until sensor S6 indicates that the mix drum is filled with blended chemical to a level greater than or equal to the high level as shown at step 108. Thereafter, when mixed chemical is transferred to the point-of-use station and sensor S5 indicates that the level of chemical has dropped below the low level, the steps described above are repeated.

Although the present invention has been described with reference to preferred embodiments, those skilled in the art will recognize that changes can be made in form and detail without departing from the spirit and scope of the invention.

What is claimed is:

1. A chemical mixing system for controlling a concentration of a chemical species in an admixture such that the concentration of the chemical species is maintained within a defined qualification range, said chemical mixing system comprising:

(a) a mix vessel having an internal volume suitable for preparing a batch from ingredients comprising a diluent and a concentrated solution containing a relatively high concentration of the chemical species relative to the qualification range, wherein the mix vessel is adapted to receive the concentrated solution and the diluent from first and second supply sources, respectively;

(b) a mix drum having an internal volume for holding a supply of the admixture, wherein the internal volume of the mix drum is of a size sufficient for holding a plurality of batches prepared in the mix vessel, and wherein the mix drum is coupled to the mix vessel so that one or more batches prepared in the mix vessel can be transported to the internal volume of the mix drum in order to replenish the supply of, and controllably adjust the concentration of the chemical species in, the admixture; and (c) a control system responsive to information comprising a measured concentration of the chemical species in the admixture, wherein said control system is capable of generating control signals for controlling the amounts of the concentrated solution and the diluent which are combined in the mix vessel when a batch is prepared so that the prepared batch comprises a corrective concentration of the chemical species relative to the measured concentration of the chemical species in the admixture.

2. The chemical mixing system of claim 1, wherein the control signals are valve control signals and the system further comprises a plurality of control valves disposed in the chemical mixing system at positions effective for regulating the amount of the concentrated solution and the diluent added to the mix vessel from the first and second supply sources, respectively, wherein the control valves are actuated in response to information comprising the valve control signals generated by the control system.

3. The chemical mixing system of claim 1, wherein the control system further comprises a plurality of sensors disposed on the system at positions effective to generate sensor signals representative of the respective amounts of the concentrated solution and diluent which are added to the internal volume of the mix vessel, and wherein the control system is responsive to information comprising both the measured concentration and the sensor signals.

4. The chemical mixing system of claim 3, wherein the plurality of sensors comprises:

(a) a first sensor disposed on the system at a position effective for detecting when a defined amount of one of the concentrated solution and the diluent is added to the mix vessel;

(b) a second sensor disposed on the system at a position effective for detecting when a combined amount of the concentrated solution and the diluent in the mix vessel is effective to provide a batch having a corrective concentration of the chemical species which is within the qualification range;

(c) a third sensor disposed on the system at a position effective for detecting when a combined amount of the concentrated solution and the diluent in the mix vessel is effective to provide a batch having a corrective concentration of the chemical species which is less than the qualification range; and a fourth sensor disposed on the system at a position effective for detecting when a combined amount of the concentrated solution and the diluent in the mix vessel is effective to provide a batch having a corrective concentration of the chemical species which is greater than the qualification range.

5. The chemical mixing system of claim 3, wherein the sensors are disposed on the mix vessel.

6. The chemical mixing system of claim 1, wherein the ratio of the mix vessel internal volume to the mix drum internal volume is about 1:10.

7. The chemical mixing system of claim 1, wherein the mix vessel and the mix drum each comprise a corrosion resistant material selected from the group consisting of an ultra high molecular weight polyethylene and a perfluoroalkoxy material.

8. The chemical mixing system of claim 1, wherein the concentrated solution is a concentrated aqueous HF solution and the diluent is ultra pure water.

9. The chemical mixing system of claim 1, wherein the mix drum further comprises:

(a) a low level sensor disposed at a low volume level, said low level sensor capable of generating a low level sensor signal indicative of when the supply of admixture in the drum corresponds to the low volume level; and (b) a high level sensor disposed at a high volume level, said high level sensor capable of generating high level sensor signals indicative of when the supply of the admixture in the drum corresponds to the high volume level; and wherein the control system is responsive to such low and high level sensor signals such that the control system causes batchwise replenishment and chemical species concentration control of the admixture supply when the low level sensor generates a signal indicating that the volume level of the supply admixture in the mix drum corresponds to the low volume level and such that the control system stops such batchwise replenishment and chemical species concentration control when the high level sensor generates a signal indicating that the volume of the admixture supply in the mix drum corresponds to the high volume level.

10. The chemical mixing system of claim 1, wherein the chemical mixing system further comprises a plurality of pressure vacuum vessels for motivating the concentrated solution and the diluent through at least a portion of the system.

11. The chemical mixing system of claim 1 further comprising:

(a) an exit line for transmitting the admixture from the mix drum to a point of use; and (b) a conductivity probe disposed on said exit line for measuring said measured concentration of the chemical species in the admixture.

12. The chemical mixing system of claim 3, wherein said plurality of sensors comprises:

(a) a first sensor disposed on the mix vessel at a level corresponding to a predefined amount of diluent;

(b) a second sensor disposed on the mix vessel at a level higher than the first sensor by an amount which corresponds approximately to a concentrated solution volume that will yield a batch having a chemical species concentration within the qualification range;

(c) a third sensor disposed on the mix vessel at a level higher than the first sensor, but lower than the second sensor, to approximately correspond to a concentrated solution volume that will provide a batch having a chemical species concentration which is less than the qualification range; and (d) a fourth sensor disposed on the mix vessel at a level higher than the second sensor at a position which corresponds approximately to a concentrated solution volume that will yield a batch having a chemical species concentration which is greater than the qualification range.

13. A process for controlling an amount of a chemical species in an admixture, comprising the steps of:
   (a) providing a supply of the admixture, wherein the admixture comprises a concentration of the chemical species;
   (b) measuring the concentration of the chemical species in the admixture;
   (c) determining if the measured concentration is within a defined qualification range;
   (d) preparing a batch comprising a corrective concentration of the chemical species relative to the measured concentration of the chemical species in the admixture, wherein the step of preparing the batch comprises the steps of:
      (i) providing ingredients comprising a concentrated solution and a diluent, wherein the concentrated solution contains a relatively high concentration of the chemical species relative to the qualification range;
      (ii) providing a mix vessel having an internal volume suitable for preparing the batch, wherein the mix vessel is adapted to receive the concentrated solution and the diluent from first and second supply sources, respectively, and wherein the system is provided with a plurality of sensors capable of generating sensor signals representative of the respective amounts of the concentrated solution and the diluent which are added to the internal volume of the mix vessel; and
      (iii) adding amounts of said ingredients to the mix vessel effective to provide the batch with the corrective concentration of the chemical species, wherein the amount of said ingredients added to the mix vessel is controlled in response to information comprising the sensor signals and to the measured concentration of the chemical species in the admixture; and
   (e) combining the batch with the admixture supply in order to controllably adjust the concentration of the chemical species in the admixture.

14. The process of claim 13, wherein at least a portion of the admixture supply is provided in a mix drum having an internal volume for holding said portion of the admixture, and wherein a mix drum conduit assembly is coupled to the mix drum, said mix drum conduit assembly including (i) a line for transporting the admixture from the mix drum to a point of use and (ii) a recirculation line for transporting the admixture to and from the mix drum.

15. The process of claim 14, wherein the step of measuring the concentration of the chemical species in the admixture comprises measuring said concentration from a portion of the admixture which is being transported through said mix drum conduit assembly.

16. The process of claim 14, wherein the internal volume of the mix vessel is less than the internal volume of the mix drum, and wherein the mix vessel is coupled to the mix drum by a conduit for transmitting batches from the mix vessel to the mix drum.

17. The process of claim 16, wherein the ratio of the internal volume of the mix vessel to the internal volume of the mix drum is about 1:10.

18. The process of claim 13, wherein the plurality of sensors comprises:

(a) a first sensor disposed on the system at a position effective for detecting when a defined amount of one of the concentrated solution and the diluent is added to the mix vessel;
(b) a second sensor disposed on the system at a position effective for detecting when a combined amount of the concentrated solution and the diluent in the mix vessel is effective to provide a batch having a corrective concentration of the chemical species which is within the qualification range;
(c) a third sensor disposed on the system at a position effective for detecting when a combined amount of the concentrated solution and the diluent in the mix vessel is effective to provide a batch having a corrective concentration of the chemical species which is less than the qualification range; and
(d) a fourth sensor disposed on the system at a position effective for detecting when a combined amount of the concentrated solution and the diluent in the mix vessel is effective to provide a batch having a corrective concentration of the chemical species which is greater than the qualification range.

19. The process of claim 16, wherein the chemical constituent sensors are disposed on the mix vessel.

20. The process of claim 13, wherein said plurality of sensors comprises:
   (a) a first sensor disposed on the mix vessel at a level corresponding to a predefined amount of diluent;
   (b) a second sensor disposed on the mix vessel at a level higher than the first sensor by an amount which corresponds approximately to a concentrated solution volume that will yield a batch having a chemical species concentration within the qualification range;
   (c) a third sensor disposed on the mix vessel at a level higher than the first sensor, but lower than the second sensor, to approximately correspond to a concentrated solution volume that will provide a batch having a chemical species concentration which is less than the qualification range; and
   (d) a fourth sensor disposed on the mix vessel at a level higher than the second sensor at a position which corresponds approximately to a concentrated solution volume that will yield a batch having a chemical species concentration which is greater than the qualification range.

21. The process of claim 16, wherein the mix vessel and the mix drum each comprise a corrosion resistant material selected from the group consisting of an ultra high molecular weight polyethylene and a perfluoroalkoxy material.

22. The process of claim 13, wherein the concentrated solution is a concentrated aqueous HF solution and the diluent is ultra pure water.

23. The process of claim 13, wherein the mix drum further comprises:
   (a) a low level sensor disposed at a low volume level, said low level sensor capable of generating a low level sensor signal indicative of when the supply of admixture in the mix drum corresponds to the low volume level; and
   (b) a high level sensor disposed at a high volume level, said high level sensor capable of generating high level sensor signals indicative of when the supply of the admixture in the mix drum corresponds to the high volume level; and
   wherein the method further comprises providing a control system responsive to such low and high level sensor signals such that the control system causes batchwise replenishment and chemical species concentration control of the admixture supply when the low level sensor generates a signal indicating that the volume level of the supply admixture in the mix drum corresponds to the low volume level and stops such batchwise replenishment and chemical species concentration control when the high level sensor generates a signal indicating that the volume of the admixture in the mix drum corresponds to the high volume level.

24. The process of claim 16, further comprising the steps of:
   (a) transporting respective volumes of the concentrated solution and the diluent into the mix vessel in order to prepare the batch having a corrective concentration of the chemical species;
   (b) transporting the batch from the mix vessel to the mix drum; and
   (c) transporting the admixture from the mix drum to a point of use;
   wherein said transporting steps are caused by a plurality of pressure vacuum vessels.

25. A process for controlling an amount of a chemical species in an admixture, comprising the steps of:
   (a) providing a supply of the admixture, wherein the admixture comprises a concentration of the chemical species;
   (b) measuring the concentration of the chemical species in the admixture;
   (c) determining if the measured concentration is within a defined qualification range; and
   (d) batchwise adjusting the concentration of the chemical species in the admixture in response to the measured concentration of the chemical species in the admixture, said batchwise adjusting step comprising the steps of:
      (i) providing a concentrated solution having a high concentration of the chemical species relative to the qualification range;
      (ii) providing a diluent;
      (iii) providing a control system responsive to information comprising the measured concentration of the chemical species in the admixture, wherein said control system is capable of generating control signals for controlling respective amounts of the concentrated solution and the diluent in order to provide a batch having a corrective concentration of the chemical species relative to the measured concentration of the chemical species in the admixture; and
      (iv) using information comprising the control signals to controllably dilute the concentrated solution with an amount of the diluent effective to provide said batch having a corrective concentration of the chemical species relative to the measured concentration of the chemical species in the admixture; and
      (v) combining the batch with the supply of the admixture.

26. The process of claim 25, wherein at least a portion of the admixture supply is provided in a mix drum having an internal volume for holding said portion of the admixture, and wherein a mix drum conduit assembly is coupled to the mix drum, said mix drum conduit assembly including (i) a line for transporting the admixture from the mix drum to a point of use and (ii) a recirculation line.

27. The process of claim 26, wherein the step of measuring the concentration of the chemical species in the admixture comprises measuring said concentration from a portion of the admixture which is being transported through said mix drum conduit assembly.

28. The process of claim 26, wherein the batch is prepared in a mix vessel having an internal volume, wherein the internal volume of mix vessel is less than the internal volume of the mix drum, and wherein the mix vessel is coupled to the mix drum by a conduit for transmitting batches from the mix vessel to the mix drum.

29. The process of claim 26, wherein the ratio of the internal volume of the mix vessel to the internal volume of the mix drum is about 1:10.

30. The process of claim 28, further comprising the step of providing a plurality of sensors disposed on the mix vessel at positions effective to generate sensor signals representative of the respective amounts of the concentrated solution and diluent which are added to the internal volume of the mix vessel, and wherein the control system is responsive to information comprising both the measured concentration and the sensor signals for controlling the amounts of the concentrated solution and diluent which are combined to form the batch.

31. The process of claim 30, wherein the plurality of sensors comprises:
   (a) a first sensor disposed on the mix vessel at a position effective for detecting when a defined amount of one of the concentrated solution and the diluent is added to the mix vessel;
   (b) a second sensor disposed on the mix vessel at a position effective for detecting when a combined amount of the concentrated solution and the diluent in the mix vessel is effective to provide a batch having a corrective concentration of the chemical species which is within the qualification range;
   (c) a third sensor disposed on the mix vessel at a position effective for detecting when a combined amount of the concentrated solution and the diluent in the mix vessel is effective to provide a batch having a corrective concentration of the chemical species which is less than the qualification range; and
   (d) a fourth sensor disposed on the mix vessel at a position effective for detecting when a combined amount of the concentrated solution and the diluent in the mix vessel is effective to provide a batch having a corrective concentration of the chemical species which is greater than the qualification range.

32. The chemical mixing system of claim 3, wherein said plurality of sensors comprises:
   (a) a first sensor disposed on the mix vessel at a level corresponding to a predefined amount of diluent;
   (b) a second sensor disposed on the mix vessel at a level higher than the first sensor by an amount which corresponds approximately to a concentrated solution volume that will yield a batch having a chemical species concentration within the qualification range;
   (c) a third sensor disposed on the mix vessel at a level higher than the first sensor, but lower than the second sensor, to approximately correspond to a concentrated solution volume that will provide a batch having a chemical species concentration which is less than the qualification range; and
   (d) a fourth sensor disposed on the mix vessel at a level higher than the second sensor at a position which corresponds approximately to a concentrated solution volume that will yield a batch having a chemical species concentration which is greater than the qualification range.

33. The process of claim 28, wherein the mix vessel and the mix drum each comprise a corrosion resistant material selected from the group consisting of an ultra high molecular weight polyethylene and a perfluoroalkoxy material.

34. The process of claim 25, wherein the concentrated solution is a concentrated aqueous HF solution and the diluent is ultra pure water.

35. The process of claim 26, wherein the mix drum further comprises:

(a) a low level sensor disposed at a low volume level, said low level sensor capable of generating a low level sensor signal indicative of when the supply of admixture in the drum corresponds to the low volume level; and (b) a high level sensor disposed at a high volume level, said high level sensor capable of generating high level sensor signals indicative of when the supply of the admixture in the drum corresponds to the high volume level; and wherein the control system is responsive to such low and high level sensor signals such that the control system causes batchwise replenishment and chemical species concentration control of the admixture supply when the low level sensor generates a signal indicating that the volume level of the supply admixture in the mix drum corresponds to the low volume level and stops such batchwise replenishment and chemical species concentration control when the high level sensor generates a signal indicating that the volume of the admixture in the mix drum corresponds to the high volume level.

* * * * *